Jan. 16, 1940. F. P. MILLER ET AL Re. 21,325

SLIDE FASTENER

Original Filed June 22, 1934

INVENTORS
Frank P. Miller and
Lewis Steel
BY Green & McCallister
Their ATTORNEYS.

Reissued Jan. 16, 1940 Re. 21,325

UNITED STATES PATENT OFFICE 21,325

SLIDE FASTENER

Frank P. Miller and Lewis Skeel, Meadville, Pa., assignors, by mesne assignments, to Joy Fastener Company, Franklin, Pa., a corporation of Pennsylvania Original No. 2,108,009, dated February 8, 1938, Serial No. 145,997, June 2, 1937, which is a division of Serial No. 731,995, June 22, 1934. Application for reissue November 7, 1938, Serial No. 239,324

17 Claims. (Cl. 24—205)

This application relates to slide fasteners and is a division of our application Serial No. 731,995, which issued as Patent No. 2,108,007 on February 8, 1938.

Briefly, the invention of this application looks to the production of metallic slide fastener elements in strip form and more particularly in spaced relation along at least one edge of a band, webbing or ribbon to achieve, among other things, a reduced cost of manufacture; and to provide for the easy handling of the fastener elements during buffing, coloring and such other intermediate processes as may be employed.

By way of preliminary reference to the coloring of the metallic fastener elements in any selected manner and while still in strip form, it is pointed out that the connection of the fastener elements with the supporting webbing or band thereof is such that, although the fastener elements are severed from the supporting band after the coloring process, there will be left on the fastener elements no raw, uncolored metal edges or surfaces exposed to view, which edges or surfaces would mar the appearance of the finished product, especially when conspicuously in place on a garment, a handbag or one of the numerous other articles to which slide fasteners are applied.

Another advantage in the formation of metallic fastener elements in spaced relation and attached to a continuous web or band will be found to reside in the ease and efficiency with which the fastener elements may be presented to the cutting-off or severing mechanism and the assembly device.

In addition, the invention makes provision for the buffing of the fastener elements while still in strip form and immediately after the forming or punching operation to avoid special handling of the fastener elements for this purpose and, at the same time, to avoid an appreciable increase in the cost of manufacture due to the buffing operation, it being observed in passing that the proper and inexpensive buffing of fastener elements to remove burrs and sharp edges therefrom is recognized in this art as quite a problem.

The invention also contemplates a novel form of interfitting male and female connection between the completed fastener elements, which connection will be found to simplify manufacture; make possible the formation of the individual fastener elements with slightly rounded ends to the interlocking heads to add to the appearance of the finished article; to facilitate the meshing of the interlocking heads of the fastener elements and, at the same time, to limit rocking movement of the fastener elements, one with respect to another when in final interdigitating relation.

Other objects and advantages will be apparent during the course of the following description.

In the accompanying drawing forming a part of this application and in which like numerals are employed to designate like parts throughout the same:

It will be seen that the projections or male members of the interlocking heads of the fastener elements are tapered toward the leading ends thereof while the complemental sockets 36 are flared or enlarged toward the inlet ends thereof for the easy reception of the projections.

Also, the sockets 36 and the resulting projections will be found to be in the form of flattened ovals having parallel side walls in longitudinal cross section joined by approximately semi-circular end walls. This configuration facilitates the engagement and disengagement of the elements of the completed fastener and, in addition, makes possible the rounding of the adjacent end portions of the interlocking heads so as to avoid sharp angles or corners which might interfere with the proper bringing together and later separation of the fastener elements in the completed article. The rounding of the end portions of the interlocking heads also adds to the appearance of the completed article.

Figure 1:
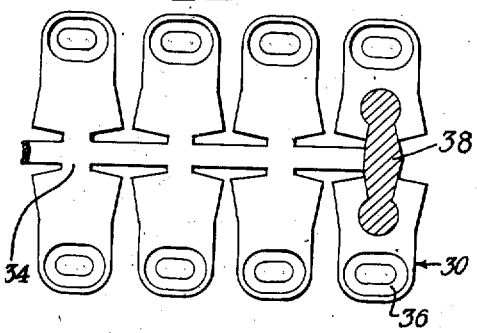
Figure 1 is a fragmentary plan view of a strip of metallic fastener elements embodied in the invention, the view illustrating a die in operative relation to oppositely located fastener elements.

The arrangement of the rows of metal fastener elements, as shown in Fig. 1, and more particularly, the connection of the individual fastener elements with the metal web or band 32 through the intervention of the lateral branches 34, provides a simple and convenient means by which the fastener elements may be colored, dyed or plated while still in strip form. It will be observed that all those surfaces and edges of the fastener elements exposed in the completed slide fastener are exposed for application of a coloring, dyeing or plating medium, even though the fastener elements are still in strip form.

That is to say, the particular connection between the band 32 and the individual fastener elements calls for the subsequent employment of a cut-off punch 38 of a width and formation such as to simultaneously cut through oppositely located fastener elements without leaving raw edges that will be exposed in the finished product. When the cut-off punch 38 is advanced, as shown in Fig. 1, the oppositely located fastener elements are bifurcated or formed with tape engaging jaws while, at the same time, the fastener elements are severed from the webbing 32 and the lateral branches 34.

Of course, the strip of fastener elements 36 is subjected to the action of the cut-off punch only after the coloring, dyeing or plating operation, and it is important to observe that the raw metal edges left by the cut-off punch will engage the tape and will not be exposed to view in the completed fastener.

The cut-off punch 38 is shown to have enlarged cylindrically beaded edges with the element engaging sides of the punch in converging relation to form key-hole openings in the fastener elements.

The key-hole openings thus produced in the individual fastener elements, at the jaw portions thereof, of course, might be said to have circular inner portions and diverging side walls, the latter defining gradually restricted entrance openings for the tape.

It is further illustrated in Fig. 1 that the jaw portions of the individual metal fastener elements have the outer edges thereof initially flared or in diverging relation. This provides for the subsequent inward clamping of the jaws in engagement with the tape, bringing the outer edges of the jaws into approximately parallel relation to each other.

Attention is now invited to the fact that the arrangement of the fastener elements in rows at opposite sides of the intervening web, with the various edges of the fastener elements spaced from each other and from the web, not only provides for the coating of the entire surfaces of the fastener elements, but, at the same time, looks to effective and expeditious treatment of the metal fastener elements to remove therefrom those burrs and sharp edges resulting from the preceding punching operation on the metallic strip and all while the fastener elements are still in strip form. This also avoids material waste.

It is, of course, understood that in making the strip shown in Fig. 1, a flat metallic strip, ribbon or band having a width equal to or slightly greater than the distance between the head end portions of the oppositely located fastener elements was utilized which was subjected to a punching or forming operation to blank out the opposed fastener elements and coin the interlocking head at the end of each element.

Figure 2:
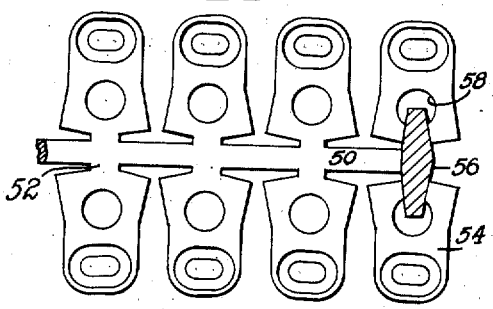
Fig. 2 is a similar view disclosing a slightly modified form of strip.

In the form of strip illustrated in Fig. 2, the metal band or ribbon 50 is provided with laterally projecting unitary branches or legs 52 joined with the jaw portions of the fastener elements 54 at the points where the cut-off punch 56 passes through the material forming this strip.

The form of strip shown in Fig. 2 differs from the disclosure in Fig. 1, in that the individual fastener elements are provided with circular openings formed during the punching operation by which the fastener elements are outlined or given the form shown in Fig. 2. This form of strip calls for the employment of the cut-off punch 56 in which the sides thereof diminish in wall thickness toward the outer edges thereof and which punch may be without the beaded outer edges.

The operation of the cut-off punch 56 leaves oppositely located fastener elements 54 with key-hole openings for the reception of mounting tapes, the outer portions of such openings having converging sides to guide the tape into proper position between the tape engaging jaws.

Of course, as one of the final steps in the mounting of the individual fastener elements 54 upon tapes, the jaws are brought into pressure engagement with the tapes and in looking to this, it will be found that the jaw portions of the metal fastener elements have the outer edges thereof in initially diverging or flared relation so that when the jaws are clamped in engagement with the tapes, the outer edges of the fastener elements will be approximately parallel throughout.

The arrangement of the fastener elements in strip form provides for the buffing of the fastener elements while still in strip form and immediately after the initial forming operation; provides a simple means by which the entire ultimately exposed surfaces of the individual fastener elements may be colored, plated or dyed, and also provides for the twin production of fastener elements at each stroke of the punch press and looks to the accelerated separation of the individual fastener elements from the strip, and the delivery of the fastener elements to assembly units.

Figure 3:
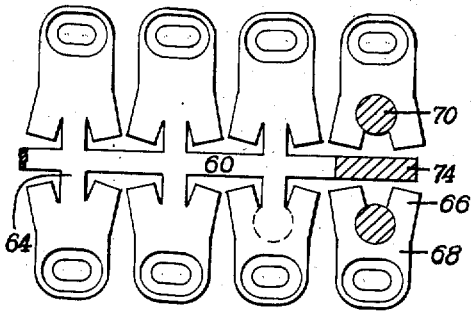
Fig. 3 is a similar view disclosing another form of strip.

In the form of strip disclosed in Fig. 3, the central band or ribbon is designated by the numeral 60 and is provided at uniformly spaced points with pairs of laterally projecting branches or lugs 64 extending between the diverging jaws 66 of the fastener elements 68. More specifically, the laterally projecting branches or lugs 64 connect with the individual fastener elements at points between the ends of the elements and the edges of these branches are spaced from the inner edges of the jaws, so that when the cylindrical cut-off punches 70 are advanced to the positions suggested in Fig. 3, the individual metal fastener elements will be given cylindrical recesses and at the same time the branches 64 will be cut off at the points where the same join the fastener elements.

Of course, the strip as shown in Fig. 3 was outlined by a previous forming or punching operation from an initially flat metallic ribbon or strip having a width equal to or greater than the distance between the end portions of the interlocking heads of oppositely located fastener elements 68 and during which the interlocking heads were formed and the individual elements blanked out.

It will be seen that although the fastener elements 68 are in strip form, all surfaces and finally exposed edges thereof are available for coloring, dyeing or plating and that the raw edges left by the cut-off punches 70 will not be exposed to view in the completed slide fastener. In addition to looking to the coloring of the individual fastener elements while still in strip form, the form of strip shown in Fig. 3 provides a simple means by which all rough edges and burrs resulting from the original punching or forming operation on the metal strip may be removed as a preliminary to the coloring process and while, of course, the fastener elements are still in strip form.

A punch 74 may be positioned between the cut-off punches 70 and caused to operate in unison therewith to cut the central webbing or ribbon 60 into short pieces and thereby avoid an objectionable coiling of this material in the region of the cut-off punches.

Figure 4:
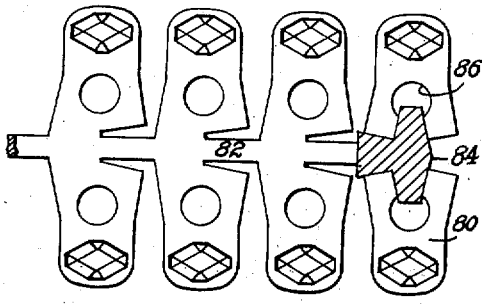
Fig. 4 is a similar view disclosing a further form of strip.
Figure 7:
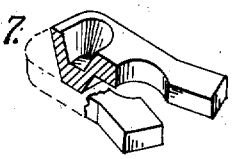
Fig. 7 is a fragmentary sectional perspective of a modified form of fastener element.

Fig. 4 shows a form of strip in which the fastener elements 80 are arranged at right angles to the intervening connecting metallic ribbon or band 82 of the strip and in the form of parallel rows in which the fastener elements are arranged in spaced edge-to-edge relation.

In this form of strip, the inner or jaw portions of the fastener elements 80 are indirectly joined with the longitudinally extending band or ribbon 82 by means of an intervening approximately triangular portion of ribbon material extending laterally from central web 82, and it requires a cut-off punch 84, somewhat T-shaped in cross-section to complete the tape gripping jaws of the fastener elements and to sever these fastener elements from the central webbing 82.

In the form of strip shown in Fig. 4, the fastener elements are provided with circular openings 86 and it is the function of the lateral vanes of the cut-off punch 84 to cut through those portions of the fastener elements between the openings 86 and the opposed or inner ends of the fastener elements. When the cut-off punch 84 has been advanced as shown in Fig. 4, the oppositely located fastener elements 80 are provided with jaws having the inner and outer edges thereof in somewhat diverging or flared relation. The flared arrangement of the inner edges of the jaws of the fastener elements provides for the easy entrance of the mounting tapes into the spaces between the jaws and when the jaws have been clamped in engagement with the tapes, both the inner and outer edges of the jaws will be found to be substantially parallel.

It will be seen that only one jaw of each fastener element 80 constitutes the sole connection between each fastener element and the central metal band 82, and this connection is through an intermediate portion of ribbon material so that when the cut-off punch severs a fastener element from the band 82 by removing this intermediate portion, only one end of one jaw will be left uncolored, it being understood, of course, that the strip of fastener elements as shown in Fig. 4 are colored after being buffed and prior to the action of the punch 84.

The action of the die 84 shown in Fig. 4 completes the formation of the jaws of the fastener elements and simultaneously severs two fastener elements from the central webbing or ribbon 82. If the strip has been previously colored, the uncolored portion left through the operation of the punch 84 would be of no serious consequence. Such uncolored portion of the fastener element would be at the end of only one of the jaws of the fastener element and such jaw could be arranged so that it would be on the under or inner side of the completed slide fastener and thus concealed from view. However, the point of connection between a particular fastener element 80 and the web 82 is very small and even though exposed to view would be inconspicuous.

The arrangement of metal fastener elements in strip form as shown in Fig. 4 provides for the buffing away of the sharp edges or burrs resulting from the initial forming or outlining operation and at the same time looks to the coloring of the fastener elements while in strip form, it being observed in this connection that the coloring process is materially simplified by having the fastener elements in strip form as distinguished from the coloring of the fastener elements when separated.

Figure 5:
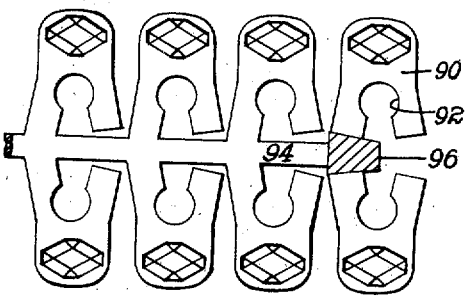
Fig. 5 is a similar view disclosing another form of strip.
Figure 8:
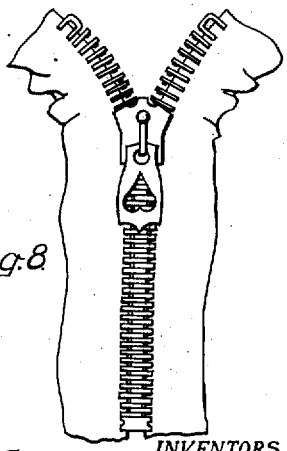
Fig. 8 is a plan view of a completed slide fastener.

In the form of metal strip disclosed in Fig. 5, the fastener elements are designated by the numeral 90 and simultaneously with the original forming or outlining operation the fastener elements are punched to provide key-hole openings 92 defining diverging jaws for engagement with the mounting tape. In this form of strip, the fastener elements are, of course, arranged in edge-to-edge spaced relation and in rows at opposite sides of the central ribbon or web 94 with one jaw of each fastener element connected with the web, through an intermediate portion of ribbon material.

The cut-off die 96 is shown to be somewhat dovetailed and acts between a pair of oppositely located fastener elements 90 to simultaneously detach these fastener elements from the web 94 by removing the intervening material. As in the case of the strip shown in Fig. 4, the terminal of one jaw of each fastener element is the only part of the fastener element not exposed for coloring while the fastener elements are still in strip form and, if expedient or desirable, this uncolored portion may be finally arranged so that it is concealed. The forming of the tape receiving openings 92 coincident with the original outlining operation of the fastener elements looks to the removal of the burrs along the walls of the openings 92 at the time the remaining portions of the fastener elements are being buffed.

Figure 6:
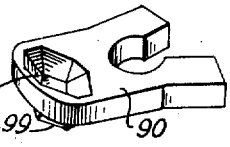
Fig. 6 is a perspective of a completed fastener element.

The fastener elements shown in Figs. 4, 5 and 6 are formed with diamond-shaped recesses 98 defining similarly shaped projections 99. Such recesses and projections are reduced or tapered from the surfaces from which the same extend or originate to provide for easy assembly when the completed fastener elements are brought into interfitting relation. More specifically, the bottom of each recess is in the form of a rhombus while the top is octagonal, having all opposed edges parallel and all of equal length in the same plane, the said edges being alternately short and long thereby producing side walls alternately triangular and trapezoidal in form.

At the same time, the form of recess and projection shown in Figs. 4, 5 and 6 permits of the formation of the interlocking head portions of the fastener elements with curved or rounded lines, thereby avoiding the sharp corners known to be objectionable for several reasons.

As brought out in the opening paragraphs of this specification, the operation of the forming dies on the metal strip leaves the newly formed fastener elements with rather sharp edges and numerous burrs, which, unless removed, would offer serious interference with the smooth operation of the slider of the completed fastener, and in addition, such burrs and sharp edges frequently snag the sheer and other fabrics with which the same come in contact.

The simple and inexpensive removal of these burrs and sharp edges from the individual metal fastener elements is recognized as a troublesome problem in this industry and, in appreciation of this, it has been found highly advantageous to buff the fastener elements while still in strip form, which has been found to provide for the most convenient handling and presentation of the fastener elements to the buffing wheels. In other words, no separate handling of the fastener elements is required for presentation of the same to the buffing wheels.

By reference to Figs. 1 to 5, inclusive, it will be seen that the various fastener elements are arranged in edge-to-edge spaced relation for engagement on all surfaces thereof by the buffing wheels.

With the strip of newly formed and buffed fastener elements thus coiled upon the reel, the reel may be removed from its mounting and conducted to a coloring, dyeing or plating room where the fastener elements are suitably colored while still in strip form.

Having thus described our invention, what we claim as new and desire to secure by Letters Patent is:

1. An article of manufacture, comprising a ribbon-like metallic member having a series of fastener elements disposed along at least one side thereof, characterized by the fact that the ribbon-like member is provided with a series of neck portions and each element is provided with tape gripping jaws at one end and an interlocking head at its other end, and the tape gripping jaws are unitarily connected with the neck portions of said ribbon-like member.

2. An article of manufacture, comprising a metallic web or band of indeterminate length and having shaped fastener elements each of which has an interlocking head at the outer end and spaced tape gripping jaws at its inner end, which are formed integrally with branches on said web or band and extend transversely from one edge thereof; the longitudinal axes of said elements being at right angles to the longitudinal axis of the web or band.

3. An article according to claim 1, characterized by the fact that the ends of the jaws of the fastener elements are spaced from the adjacent edge of the ribbon-like member.

4. An article according to claim 1, characterized by the fact that each element is unitarily connected to the ribbon-like member by a neck portion which extends between the jaws thereof and which is united to the inner sides of said jaws.

5. An article of manufacture, made from metal and comprising a ribbon-like support member having a series of fastener elements disposed in juxtaposition to one edge thereof and in spaced relation one to another and to said edge; said elements each having tape gripping jaws at one end and an interlocking head at the other and each being unitarily connected to the adjacent edge of said support member by an intervening neck portion.

6. An article according to claim 1, characterized by the fact that a series of said fastener elements is disposed along both longitudinal edges of the ribbon-like member.

7. An article of manufacture, comprising a ribbon-like member having a series of fastener elements extending laterally from at least one side thereof in fixed spaced relation and each having partially formed tape gripping jaw portions at one end and an interlocking head at the other end and each having the tape gripping jaw portions thereof unitarily connected to the ribbon-like member by a neck portion.

8. An article of manufacture, comprising a ribbon-like member having a series of fastener elements extending laterally from each side thereof and unitarily connected thereto, characterized by the fact that each fastener element is formed with a tape gripping jaw portions at one end and an interlocking head at the other and that the jaw portions of said elements are joined to opposed laterally extending portions on said ribbon-like member.

9. A metal stock strip comprising substantially completely formed fastener elements each having an interlocking head at one end and tape gripping jaw portions at the other end, and a band or ribbon-like portion for supporting said elements having a series of members projecting laterally therefrom to which the tape gripping jaw portions of said elements are unitarily connected.

10. A metal stock strip comprising uniformly spaced substantially completely formed fastener elements each having an interlocking head at one end and tape gripping jaw portions at the other end and a band or ribbon-like portion to which at least one of the tape gripping jaws of each of said elements is unitarily connected.

11. A stock strip comprising colored fastener elements each having an interlocking head at one end and tape gripping jaw portions at its other end and a band or a ribbon-like member having a series of spaced, laterally extending portions with which the tape gripping jaw portions of the fastener elements are unitarily connected.

12. A metal stock strip comprising uniformly spaced buffed and colored fastener elements each having an interlocking head at one end and tape gripping jaw portions at its other end and a band or ribbon-like portion to which each of said elements is unitarily connected by a portion which extends laterally from the ribbon-like portion to a position between its jaw portions.

13. A stock strip comprising a web or ribbon having equally spaced branches extending laterally therefrom and a slide fastener element joined to each branch and which has an interlocking head at its outer or free end and tape gripping jaws at its branch end.

14. A stock strip comprising a central web or ribbon having branches extending laterally thereof in opposite directions and fastener elements having interlocking heads and tape engaging jaw portions connected to said branches.

15. In a stock strip, a pair of spaced parallel rows of slide fastener elements arranged in side by side relation, a central web or ribbon extending lengthwise between said rows and having laterally extending branches connected with the tape gripping jaw portions of said fastener elements.

16. In a structure of the class described, a pair of rows of preformed slide fastener elements, the fastener elements of one row being provided with jaw portions in opposed relation to the jaw portions of the fastener elements of the other row, and a central web between such rows and having laterally projecting branches which extend between the said jaw portions.

17. An article of manufacture comprising a metallic web or band of indeterminate length having completely shaped metallic fastener elements along one side of said web or band each including an inter-locking head and tape gripping jaw portions and having at least one of the tape gripping jaw portions thereof unitarily connected to one edge of said web or band.

FRANK P. MILLER.
LEWIS SKEEL.